(12) United States Patent
Sontheim et al.

(10) Patent No.: US 10,904,033 B2
(45) Date of Patent: Jan. 26, 2021

(54) METHOD OF TRANSMITTING DATA

(71) Applicant: Sontheim Industrie Elektronik GmbH, Kempten (DE)

(72) Inventors: Bruno Sontheim, Kempten (DE); Stephan Strobl, Kaltental-Blonhofen (DE); Gerd Bottenbruch, Haldenwang (DE); Martin Lorenz, Kempten (DE)

(73) Assignee: Sontheim Industrie Elektronik GmbH, Kempten (DE)

( * ) Notice: Subject to any disclaimer, the term of this patent is extended or adjusted under 35 U.S.C. 154(b) by 0 days.

(21) Appl. No.: 15/298,634

(22) Filed: Oct. 20, 2016

(65) Prior Publication Data

US 2017/0118040 A1 Apr. 27, 2017

(30) Foreign Application Priority Data

Oct. 21, 2015 (DE) .................. 10 2015 117 947

(51) Int. Cl.
*H04L 12/40* (2006.01)
*H04L 29/08* (2006.01)

(52) U.S. Cl.
CPC .. *H04L 12/40195* (2013.01); *H04L 12/40169* (2013.01); *H04L 67/10* (2013.01); *H04L 2012/40215* (2013.01); *H04L 2012/40273* (2013.01)

(58) Field of Classification Search
CPC ............... H04L 12/40; H04L 12/40182; H04L 12/40189; H04L 12/40195; H04L 2012/40208; H04L 2012/40215; H04L 2012/40273; H04L 27/2626; H04L 27/2647; H04L 65/602; H04L 65/604; H04L 67/10; H04L 67/12; H04L 29/06
See application file for complete search history.

(56) References Cited

U.S. PATENT DOCUMENTS

| | | | |
|---|---|---|---|
| 2013/0179029 A1* | 7/2013 | Wang | H04L 65/4092 701/32.7 |
| 2014/0120829 A1* | 5/2014 | Bhamidipati | H04N 21/42207 455/3.06 |
| 2015/0100774 A1* | 4/2015 | Lopez | H04L 41/082 713/100 |
| 2015/0181480 A1* | 6/2015 | Bulakci | H04W 36/0005 455/436 |
| 2016/0050273 A1* | 2/2016 | Naneix | H04L 67/1095 709/219 |
| 2017/0118530 A1* | 4/2017 | Amano | H04N 21/6175 |

* cited by examiner

*Primary Examiner* — Peter Chen
(74) *Attorney, Agent, or Firm* — Collard & Roe, P.C.

(57) ABSTRACT

Method of transmitting data in a distributed system of programmable controls, wherein data are transmitted between data sources and data sinks, both of which represent a respective node in the distributed system, and wherein the respective data sources and data sinks communicating with one another are determined by way of parameters.

5 Claims, 1 Drawing Sheet

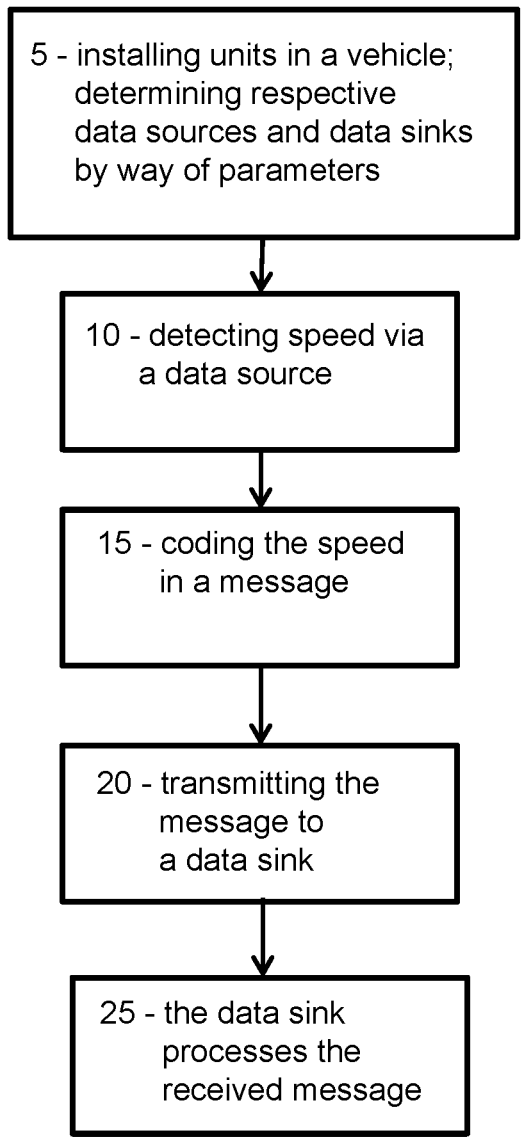

METHOD OF TRANSMITTING DATA

CROSS REFERENCE TO RELATED APPLICATIONS

Applicant claims priority under 35 U.S.C. § 119 of German Application No. 10 2015 117 947.4 filed on Oct. 21, 2015, the disclosure of which is incorporated by reference.

BACKGROUND OF THE INVENTION

1. Field of the Invention

The invention relates to a method of transmitting data in a distributed system of programmable controls.

2. Description of the Related Art

Controls of that kind communicate with one another by way of a network, field bus or the like.

In that case, which data are to be transmitted from one control apparatus to another or to be received by this are filed in the program routines.

The address of the respective other control apparatus is then also filed in the program routines.

However, this is more than problematic, since even in the case of slight changes, for example through exchange of a unit or control apparatus, this adaptation has to be carried out every time in the program code.

As a result, the entire program code on every occasion has to be subjected to evaluation and different tests in order to ensure that incorrect functions are at least largely excluded.

SUMMARY OF THE INVENTION

The object of the invention is to propose a method which makes it possible to eliminate these tedious evaluations and tests, which also give rise to substantial costs.

According to the invention this object is fulfilled in that data are transmitted between data sources and data sinks which each represent a respective node in the distributed system, wherein the respective data sources and data sinks in mutual communication are determined by way of parameters.

The network of data sources and data sinks is thus defined by way of parameters independently of the filed program routines.

In that case it has proved very advantageous if the nodes are each furnished with a control program and standard functions.

Consequently, the control program can be decoupled from standard functions, which the control program can access.

In this connection it is also extremely advantageous if the communication functions are filed as fixed program routines.

Access to communication functions is thereby made possible for the control program.

According to a further embodiment of the invention it is then very advantageous if the program routines for the communication functions can be parameterised.

Access to the communication functions can thus be adapted by way of parameters.

In that case it is also extremely advantageous if the parameterisation is carried out by way of an external configuration file.

The parameters can thus be adapted independently of the control program. Adaptation during the running time of the control program is even conceivable.

According to a further embodiment of the invention it is extremely advantageous if start and destination addresses of the communication functions can be parameterised.

A very high degree of flexibility is thereby guaranteed. Components can be exchanged without problems, possibly during ongoing operation.

Moreover, it is very advantageous if the protocols on which the communication functions are based can be parameterised.

The individual modules or at least program routines can thus be used even for the most diverse applications and can be based on, for example, a field bus, the Ethernet or the like.

According to a development of the invention it is also particularly advantageous if the program routines, communication functions, hardware Application Program Interfaces (APIs), etc., are virtualized.

According to the invention it is also very advantageous if the program routines, communication functions, protocols, etc., are executed independently of hardware.

A substantial degree of independence from hardware is thereby achieved. The program routines are universally usable and can run on different hardware. Thus, for example, a networked vehicle can also be equipped with a hybrid drive instead of a diesel motor. The drive is provided in each instance with specific control apparatus which exchanges standardised data with other control apparatus.

BRIEF DESCRIPTION OF THE DRAWINGS

The sole FIG. shows a flow chart of a preferred embodiment of the inventive method.

DETAILED DESCRIPTION OF THE PREFERRED EMBODIMENTS

The invention is illustrated in the following by way of an embodiment.

The invention is illustrated on the basis of control of a piste tracked vehicle, but is applicable to any control and regulating systems.

Controls and sensors, which are interconnected by way of a bus system, are installed as units in the vehicle (see box 5 in the flow chart of the sole FIG.). In that case, each unit forms a network node.

Nodes which detect and pass on data are thus data sources and those which receive and process data are data sinks.

If, for example, motor rotational speed is now detected by a data source (see box 10 in the flow chart of the sole FIG.), then this is coded (see box 15 in the flow chart of the sole FIG.) and transmitted in a message (see box 20 in the flow chart of the sole FIG.). For that purpose, the program code gives the data source a command to transmit the data packet. Specific communication functions send the data packet to the data sink.

The communication functions in that case fall back on a parameter file in which it is specified which data packet is to be transmitted by which protocol via which bus system to which data sink.

This parameter file is in that case independent of the program code.

The program code is executed, for example, in a runtime environment or a virtual machine and is thus independent of the hardware used. In that case, standardised runtime environments such as, for example, Java can be used. Abstraction between hardware-dependent routines and hardware-independent routines can also be undertaken so that the actual program code is hardware-independent and accesses hardware-dependent routines. This is particularly useful especially on embedded systems, since an operating system is usually not provided thereat.

The communication functions provide a standardised interface for the program code, to which this can have access.

The communication functions can be hardware-specific or, however, access the hardware and thus the physical interfaces by way of special hardware drivers.

Equally, not only can the communication with other nodes be abstracted in such a way, but also it is conceivable for microcontrollers—which evaluate sensors and thus serve as data sources—to access sensors in the same mode and manner so that here, as well, hardware independence is achieved.

The data sinks process the received data packets (see box 25 in the flow chart of the sole FIG.). In order to be able to receive these, the program code thereat similarly accesses communication functions, which receive the data packets and transfer to the program code.

Here, too, the program code is hardware-independent, whereagainst the communication functions directly or indirectly access the hardware.

Continuing with the example of a piste tracked vehicle: If the diesel engine is now exchanged for a hybrid unit then only the parameterisation of the control unit of the hybrid unit has to be appropriately parameterised so that rotational speed data can be represented on a display by an application running on a microcontroller.

The microcontroller display in that case does not even 'notice' that a different drive unit is installed, since its sole function is to display rotational speed data.

Equally, it is conceivable for a Controller Area Network (CAN) bus system to be converted to Ethernet.

For that purpose, the communication interfaces are exchanged and the parameterisation of the individual nodes appropriately adapted.

The program code can be executed without change.

Fresh evaluation and comprehensive tests are eliminated.

In addition, the parameterisation can be changed in ongoing operation. This is not possible with conventional approaches in which the communication is filed directly in the program code.

Rather, with every—even small—change the code had to be completely freshly compiled and tested.

In addition, it is achieved with the approach according to the invention that the program code can be repeatedly used for the most diverse applications, in which case the reliability of apparatus and installations is increased due to longer and more extensive experience with the respective program code.

The invention claimed is:

1. A method of transmitting data in a distributed system of programmable controls, comprising the following steps:
    installing interconnected controls and sensors in a plurality of hardware to provide a plurality of units; each unit of the plurality of units forming a node of a plurality of nodes in the distributed system;
    determining by parameters data sources and data sinks to communicate with one another, wherein the data sources and the data sinks represent a respective node of the plurality of nodes in the distributed system, the respective node comprising a control program and standard functions, wherein communication functions are fixed program routines and fall back on a parameter file comprising the parameters;
    transmitting the data between the data sources and the data sinks;
    parameterizing the program routines for the communication functions;
    adapting the parameters independently of the control program while the control program is running; and
    exchanging a unit of the plurality of units during operation of the distributed system;
    wherein the control program is independent of the communication functions; and
    wherein the program routines are hardware independent and universally usable with different hardware.

2. The method according to claim 1, wherein the parameterization is carried out by way of an external configuration file.

3. The method according to claim 1, wherein start and destination addresses of the communication functions are parameterized.

4. The method according to claim 1, wherein protocols on which the communication functions are based are parameterized.

5. The method according to claim 1, wherein the program routines and hardware Application Program Interfaces (APIs) are virtualized.

* * * * *